US012614211B2

(12) United States Patent
Smalley et al.

(10) Patent No.: US 12,614,211 B2
(45) Date of Patent: Apr. 28, 2026

(54) PRESENCE DETECTION AND TARGETED CONTENT

(71) Applicant: Comcast Cable Communications, LLC, Philadelphia, PA (US)

(72) Inventors: Preston Smalley, Danville, CA (US); Tyler Kareeson, Menlo Park, CA (US); Francisco Niebres, San Francisco, CA (US); Scott Eklund, San Jose, CA (US); Josh Kennedy, Sunnyvale, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 295 days.

(21) Appl. No.: 14/685,424

(22) Filed: Apr. 13, 2015

(65) Prior Publication Data

US 2016/0300266 A1     Oct. 13, 2016

(51) Int. Cl.
 *G06Q 30/00*   (2023.01)
 *G06Q 30/02*   (2023.01)
      (Continued)

(52) U.S. Cl.
 CPC ......... *G06Q 30/0261* (2013.01); *G06Q 30/02* (2013.01); *G06Q 30/0267* (2013.01); *G06Q 30/0273* (2013.01); *H04W 4/029* (2018.02)

(58) Field of Classification Search
 CPC ....... H04W 4/021; H04W 4/008; H04W 4/80; H04W 4/02; H04W 4/023; H04W 12/06; H04W 84/18; H04W 16/14; H04W 8/26;

H04W 52/0229; H04W 48/10; H04W 52/0219; H04W 52/0238; H04W 4/029; H04W 8/22; H04W 48/14; H04W 8/08;
(Continued)

(56) References Cited

U.S. PATENT DOCUMENTS 5,280,295 A * 1/1994 Kelley .................. G01S 5/0009
              342/463
7,016,813 B2 3/2006 Alexander et al.
(Continued)

FOREIGN PATENT DOCUMENTS

CA  2910447 A1  4/2016
EP  2518678   10/2012
   (Continued)

OTHER PUBLICATIONS

Jiang, Xiaofan, et al. "Design and evaluation of a wireless magnetic-based proximity detection platform for indoor applications." Proceedings of the 11th international conference on Information Processing in Sensor Networks. 2012. (Year: 2012).*
(Continued)

*Primary Examiner* — Michael Bekerman
(74) *Attorney, Agent, or Firm* — Ballard Spahr LLP

(57) ABSTRACT

Provided are methods and systems for detecting locations and positions of users to determine best options for consuming content. In one implementation, advertisements can be tailored and presented to the detected users. The methods and systems can also detect when a user is no longer in a position to consume content and can take other actions, such as presenting a default advertisement or tailoring advertisements for a different user.

23 Claims, 8 Drawing Sheets

(51) Int. Cl.
    *G06Q 30/0251*     (2023.01)
    *G06Q 30/0273*     (2023.01)
    *H04W 4/029*     (2018.01)

(58) Field of Classification Search
    CPC ..... H04L 67/306; H04L 67/12; H04L 1/0002;
        H04L 1/0041; H04L 1/18; H04L 5/0064;
        H04L 67/1097; G06Q 20/325; G06Q
        10/08; G06Q 10/087; G06Q 10/0832;
        G06Q 10/0833; G06Q 10/06; G06Q
        30/02; G06Q 30/0207–0277
    See application file for complete search history.

(56)            References Cited

U.S. PATENT DOCUMENTS

| | | | |
|---|---|---|---|
| 7,962,544 B2 | 6/2011 | Torok et al. | |
| 8,181,211 B2 | 5/2012 | Olson et al. | |
| 8,489,738 B2 | 7/2013 | Sobotka et al. | |
| 8,611,519 B2 | 12/2013 | Shah et al. | |
| 8,634,533 B2 | 1/2014 | Strasters | |
| 8,738,024 B1* | 5/2014 | Kerr | H04W 4/021 |
| | | | 370/310 |
| 8,775,807 B1* | 7/2014 | Vazquez | G06F 21/31 |
| | | | 713/168 |
| 8,849,199 B2 | 9/2014 | Shrum, Jr. et al. | |
| 9,202,245 B2* | 12/2015 | Kostka | H04W 12/06 |
| 9,313,218 B1 | 4/2016 | Savant | |
| 9,420,336 B1 | 8/2016 | Woodhead et al. | |
| 9,426,615 B2 | 8/2016 | Vigier et al. | |
| 9,521,648 B1 | 12/2016 | Kolekar et al. | |
| 9,613,639 B2 | 4/2017 | Adachi et al. | |
| 9,820,155 B2 | 11/2017 | Chen | |
| 9,998,969 B2 | 6/2018 | Maguire et al. | |
| 10,062,073 B2 | 8/2018 | Baldie | |
| 10,165,397 B2 | 12/2018 | Connelly et al. | |
| 10,212,545 B2 | 2/2019 | Choi et al. | |
| 10,217,151 B1 | 2/2019 | Greiner et al. | |
| 10,251,022 B2 | 4/2019 | Connelly et al. | |
| 10,289,917 B1 | 5/2019 | Fu et al. | |
| 10,321,259 B2 | 6/2019 | Connelly et al. | |
| 10,979,856 B2 | 4/2021 | Venkat et al. | |
| 11,167,172 B1 | 11/2021 | Putnam et al. | |
| 2002/0116266 A1* | 8/2002 | Marshall | G06Q 10/10 |
| | | | 705/14.14 |
| 2003/0014275 A1* | 1/2003 | Bearden, III | G06Q 10/10 |
| | | | 705/1.1 |
| 2004/0141605 A1* | 7/2004 | Chen | H04M 3/42221 |
| | | | 379/202.01 |
| 2006/0270421 A1* | 11/2006 | Phillips | G08B 21/0269 |
| | | | 455/457 |
| 2006/0290519 A1 | 12/2006 | Boate et al. | |
| 2007/0121678 A1 | 5/2007 | Brooks et al. | |
| 2008/0045232 A1 | 2/2008 | Cone | |
| 2008/0153511 A1* | 6/2008 | Mock | H04W 12/35 |
| | | | 455/456.3 |
| 2008/0306826 A1* | 12/2008 | Kramer | G06Q 30/0226 |
| | | | 705/14.27 |
| 2008/0312946 A1* | 12/2008 | Valentine | G06Q 20/382 |
| | | | 705/64 |
| 2009/0171780 A1 | 7/2009 | Aldrey et al. | |
| 2009/0199107 A1 | 8/2009 | Lewis et al. | |
| 2009/0286553 A1* | 11/2009 | Northway | H04W 4/02 |
| | | | 455/456.3 |
| 2009/0319306 A1* | 12/2009 | Chanick | G06Q 20/326 |
| | | | 705/26.1 |
| 2010/0120437 A1 | 5/2010 | Foster et al. | |
| 2010/0251314 A1 | 9/2010 | Olson et al. | |
| 2010/0287052 A1* | 11/2010 | Minter | G06Q 30/02 |
| | | | 705/14.66 |
| 2011/0032109 A1 | 2/2011 | Fox | |
| 2011/0093339 A1* | 4/2011 | Morton | G06Q 30/02 |
| | | | 705/14.58 |
| 2011/0110266 A1 | 5/2011 | Li et al. | |

| | | | |
|---|---|---|---|
| 2011/0149879 A1 | 6/2011 | Noriega et al. | |
| 2011/0252130 A1 | 10/2011 | Karaoguz | |
| 2011/0307399 A1* | 12/2011 | Holmes | H04W 4/021 |
| | | | 705/319 |
| 2012/0004950 A1* | 1/2012 | Julian | G06Q 10/02 |
| | | | 705/7.32 |
| 2012/0064820 A1 | 3/2012 | Bemmel | |
| 2012/0100869 A1 | 4/2012 | Liang et al. | |
| 2012/0215637 A1* | 8/2012 | Hermann | G07F 17/3255 |
| | | | 705/14.1 |
| 2012/0278454 A1 | 11/2012 | Stewart et al. | |
| 2012/0303442 A1 | 11/2012 | Patwa et al. | |
| 2013/0049954 A1 | 2/2013 | Scannell | |
| 2013/0085834 A1* | 4/2013 | Witherspoon, Jr. | G06Q 30/02 |
| | | | 705/14.1 |
| 2013/0091209 A1 | 4/2013 | Bennett et al. | |
| 2013/0102283 A1 | 4/2013 | Lau et al. | |
| 2013/0144660 A1 | 6/2013 | Martin | |
| 2013/0174223 A1 | 7/2013 | Dykeman et al. | |
| 2013/0260693 A1* | 10/2013 | Un | H04W 64/00 |
| | | | 455/67.11 |
| 2013/0275221 A1 | 10/2013 | Zeto, III et al. | |
| 2013/0275505 A1* | 10/2013 | Gauglitz | G06F 3/0482 |
| | | | 709/204 |
| 2013/0297422 A1 | 11/2013 | Hunter et al. | |
| 2014/0052485 A1* | 2/2014 | Shidfar | G06Q 50/01 |
| | | | 705/7.13 |
| 2014/0094575 A1 | 4/2014 | Van Der Schrick et al. | |
| 2014/0106730 A1 | 4/2014 | Chatterjee | |
| 2014/0181886 A1 | 6/2014 | Goodman et al. | |
| 2014/0222531 A1* | 8/2014 | Jacobs | H04W 4/029 |
| | | | 709/204 |
| 2014/0269657 A1 | 9/2014 | Kim et al. | |
| 2014/0278736 A1 | 9/2014 | Qaim-Maqami | |
| 2014/0280985 A1 | 9/2014 | Maguire et al. | |
| 2014/0324616 A1* | 10/2014 | Proietti | G06Q 30/0601 |
| | | | 705/26.1 |
| 2014/0324931 A1 | 10/2014 | Grube et al. | |
| 2014/0329522 A1 | 11/2014 | Dayanandan et al. | |
| 2014/0351411 A1* | 11/2014 | Woods | H04W 4/021 |
| | | | 709/224 |
| 2014/0365304 A1 | 12/2014 | Showers et al. | |
| 2014/0379390 A1* | 12/2014 | Scarborough | G06Q 30/0639 |
| | | | 705/5 |
| 2015/0029020 A1 | 1/2015 | Bailey et al. | |
| 2015/0043377 A1 | 2/2015 | Cholas et al. | |
| 2015/0079942 A1 | 3/2015 | Kostka et al. | |
| 2015/0081382 A1 | 3/2015 | L'Heureux et al. | |
| 2015/0081583 A1 | 3/2015 | Butler et al. | |
| 2015/0237386 A1 | 8/2015 | Sheehan et al. | |
| 2015/0256985 A1 | 9/2015 | Kornafeld | |
| 2015/0262214 A1* | 9/2015 | Geer | G06Q 30/0226 |
| | | | 705/14.27 |
| 2015/0269600 A1 | 9/2015 | Randle | |
| 2015/0348146 A1* | 12/2015 | Shanmugam | G06Q 30/0603 |
| | | | 705/71 |
| 2015/0382140 A1 | 12/2015 | Cho et al. | |
| 2016/0050621 A1 | 2/2016 | Enomoto et al. | |
| 2016/0066154 A1* | 3/2016 | Shin | H04W 4/021 |
| | | | 455/456.1 |
| 2016/0088546 A1 | 3/2016 | Birch et al. | |
| 2016/0105360 A1 | 4/2016 | Erickson et al. | |
| 2016/0119742 A1 | 4/2016 | Connelly et al. | |
| 2016/0155148 A1 | 6/2016 | Ismail et al. | |
| 2016/0189513 A1 | 6/2016 | Sloo | |
| 2016/0249315 A1 | 8/2016 | Venkatraman et al. | |
| 2016/0269852 A1 | 9/2016 | Meyers et al. | |
| 2016/0337863 A1 | 11/2016 | Robinson et al. | |
| 2017/0010669 A1 | 1/2017 | Lim et al. | |
| 2017/0018130 A1 | 1/2017 | Robinson | |
| 2017/0019777 A1 | 1/2017 | Cole, Jr. et al. | |
| 2017/0078454 A1 | 3/2017 | Berookhim et al. | |
| 2017/0098042 A1 | 4/2017 | Darby et al. | |
| 2017/0109983 A1 | 4/2017 | Flint et al. | |
| 2017/0126800 A1 | 5/2017 | Koorapati et al. | |
| 2017/0164159 A1* | 6/2017 | Mycek | H04W 76/40 |
| 2017/0187751 A1 | 6/2017 | Andrews et al. | |
| 2017/0245105 A1 | 8/2017 | Connelly et al. | |

(56)                    References Cited

U.S. PATENT DOCUMENTS

| | | |
|---|---|---|
| 2017/0245106 A1 | 8/2017 | Connelly et al. |
| 2017/0245190 A1 | 8/2017 | Katar et al. |
| 2017/0279957 A1 | 9/2017 | Abramson et al. |
| 2018/0032997 A1 | 2/2018 | Gordon et al. |
| 2018/0176360 A1 | 6/2018 | Selim |
| 2018/0213361 A1 | 7/2018 | Venkat et al. |
| 2020/0244778 A1 | 7/2020 | Berookhim et al. |
| 2024/0163338 A1 | 5/2024 | Binder et al. |
| 2024/0236783 A9 | 7/2024 | Wen et al. |

FOREIGN PATENT DOCUMENTS

| | | |
|---|---|---|
| EP | 2518678 A1 | 10/2012 |
| EP | 2733502 | 5/2014 |
| EP | 3016450 A1 | 5/2016 |
| KR | 20220000779 A | 1/2022 |

| | | | | |
|---|---|---|---|---|
| WO | WO-2010/128980 | 11/2010 | | |
| WO | WO-2010/128980 A2 | 11/2010 | | |
| WO | WO-2013/054144 | 4/2013 | | |
| WO | 2013/163326 A1 | 10/2013 | | |
| WO | WO-2015026863 A1 * | 2/2015 | ............ | H04W 12/06 |

OTHER PUBLICATIONS

European Search Report was issued on Aug. 8, 2016 by the European Patent Office for EP Application No. 16165154.2, which was filed on Apr. 13, 2016 and published as 3082093 on Oct. 19, 2016 (Applicant—Comcast Corp.) (8 Pages).

European Search Report on Patentability was mailed on Sep. 16, 2020 by the European Patent Office for European Application No. 20158478.6, filed on Feb. 20, 2020 and published as EP 3726448 on Oct. 21, 2020 (11 Pages).

* cited by examiner

| Profile | Content Viewed | Predicted Demographic |
|---|---|---|
| 302a | Football, Action Movies | 18-35 Male |
| 302b | Cooking Shows, Soap Operas | 24-45 Female |
| 302a, 302b | Sitcoms, Crime Dramas | 21-45 Male or Female |

HCT

121

TV

Identifier
302a

User Device
124a

304

Identifier
302b

User Device
124b

702

Receive, at a first device, a first signal at a first time interval

704

Transmit, by the first device, a first indication in response to the first signal, indicating a first position of the first device within a first range, wherein the first indication causes first content to be presented on a second device, and wherein the first content presented is determined by the indication that the first device is within the first range

706

Receive, by the first device, a second signal at a second time interval

708

Transmit, by the first device, a second indication in response to the second signal, indicating a second position of the first device within a second range

710

Determine, by the first device, that the second position is not in the first range, wherein the second range comprises the first range

712

Transmit, by the first device, a notification that the first device is not in the first range to a third device, wherein the notification causes second content to be presented on the second device, and wherein the second content presented is determined by the determination that the first device is not in the first range

Figure 8:
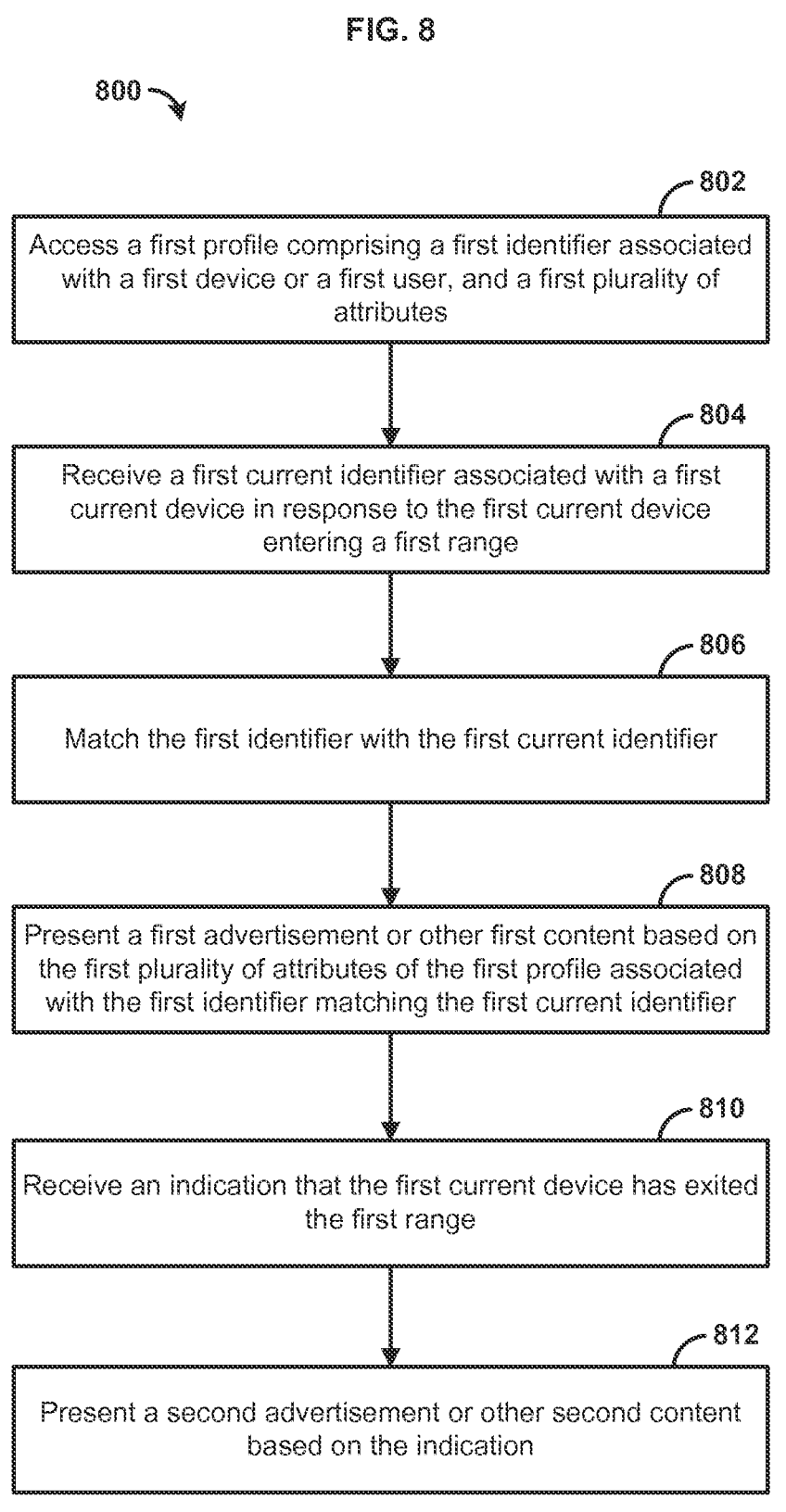

Access a first profile comprising a first identifier associated with a first device or a first user, and a first plurality of attributes

804

Receive a first current identifier associated with a first current device in response to the first current device entering a first range

806

Match the first identifier with the first current identifier

808

Present a first advertisement or other first content based on the first plurality of attributes of the first profile associated with the first identifier matching the first current identifier

810

Receive an indication that the first current device has exited the first range

812

Present a second advertisement or other second content based on the indication

PRESENCE DETECTION AND TARGETED CONTENT

BACKGROUND

In the marketing of advertisement space, a content provider can command more fees per advertisement if the content provider can deliver the advertisement to a target demographic. In television, for example, the demographic of a television program is traditionally determined by projections based on historical data, and content providers may then rely on the projections to deliver content. However, the projections suffer from inherent unreliability from the use of historical data, which results in mistargeted content delivery. These and other shortcomings of the prior art are identified and addressed by the present disclosure.

SUMMARY

It is to be understood that both the following general description and the following detailed description are exemplary and explanatory only and are not restrictive, as claimed. In one aspect, provided are methods and systems for detecting users in a position for consuming presented content. Advertisements and/or other types of content can be tailored and presented to the detected users. The methods and systems can detect when a user is no longer in a position to consume the presented content and can take one of many actions, including, but not limited to, presenting a default advertisement and/or tailoring advertisements for a different user.

In another aspect, provided are methods and systems whereby a first signal can be transmitted at a first predetermined time interval, wherein the first signal is associated with a first range. A first indication can be received from a first device in response to the first signal, indicating that the first device is within a first range. First content can be presented based on the first indication. A second signal can be transmitted at a second predetermined time interval, wherein the second signal is associated with a second range. A second indication can be received from the first device in response to the second signal, indicating that the first device is within the second range. A third signal can be transmitted at the first predetermined time interval, wherein the third signal is associated with the first range. In an aspect, no indication may be received from the first device in response to the third signal. A determination can be made that the first device has exited the first range, in response to receiving no indication from the first device in response to the third signal. Second content can be presented based on the determination that the first device has exited the first range.

Also provided are methods and systems whereby a first signal can be received at a first device at a first time interval. A first indication can be transmitted in response to the first signal, indicating a first position of the first device within a first range. In an aspect, the first indication can cause first content to be presented on a second device. In an aspect, the first content presented can be determined by the indication that the first device is within the first range. A second signal can be received by the first device at a second time interval. A second indication can be transmitted by the first device in response to the second signal, indicating a second position of the first device within a second range. A determination can be made by the first device that the second position is not in the first range, wherein the second range comprises the first range. A notification that the first device is not in the first range can be transmitted by the first device to a third device.

In an aspect, the notification can cause second content to be presented on the second device. In an aspect, the second content presented can be determined by the determination that the first device is not in the first range. For example, a user device with Bluetooth and Wi-Fi messaging capabilities can be in communication with a set top box with Bluetooth and Wi-Fi messaging capabilities. In an aspect, the first range can be a range at which the user device and the set top box can communicate with each other using Bluetooth messaging capabilities. The second range can be a range at which the user device and the set top box can communicate with each other using Wi-Fi messaging capabilities. The range at which the user device and the set top box can communicate with each other using Bluetooth messaging capabilities can be a subset of the range at which the user device and the set top box can communicate with each other using Wi-Fi messaging capabilities. The second position can be a position at which the user device and the set top box can communicate using Wi-Fi messaging capabilities, but not Bluetooth messaging capabilities. A notification that the user device is not within Bluetooth messaging range to a server of a service provider.

In another aspect, provided are methods and systems whereby one of more profiles, including a first profile, can be accessed. In an aspect, the first profile can be stored. The first profile can comprise a first identifier associated with a first device, or a first user, and a plurality of attributes associated with preferences, such as content and/or other preferences. In an aspect, the first identifier can be associated with the first user based on an association of the first user with the first device. In an aspect, a profile associated with a single user can be associated with multiple identifiers, each identifier associated with a respective device. A current identifier associated with a current device can be received in response to the current device entering a first range. The first identifier can be matched with the current identifier. A first advertisement, or other content or preference, can be determined based on the first plurality of attributes of the first profile associated with the first identifier matching the current identifier. An indication that the current device has exited the first range can be received. A second advertisement can be determined based on the indication.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 illustrates a database in accordance with an exemplary system and method;

FIG. 5 is a block diagram of an exemplary system;

FIG. 7 is a flow chart of an exemplary method; and

FIG. 8 is a flow chart of an exemplary method.

DETAILED DESCRIPTION

Figure 1:
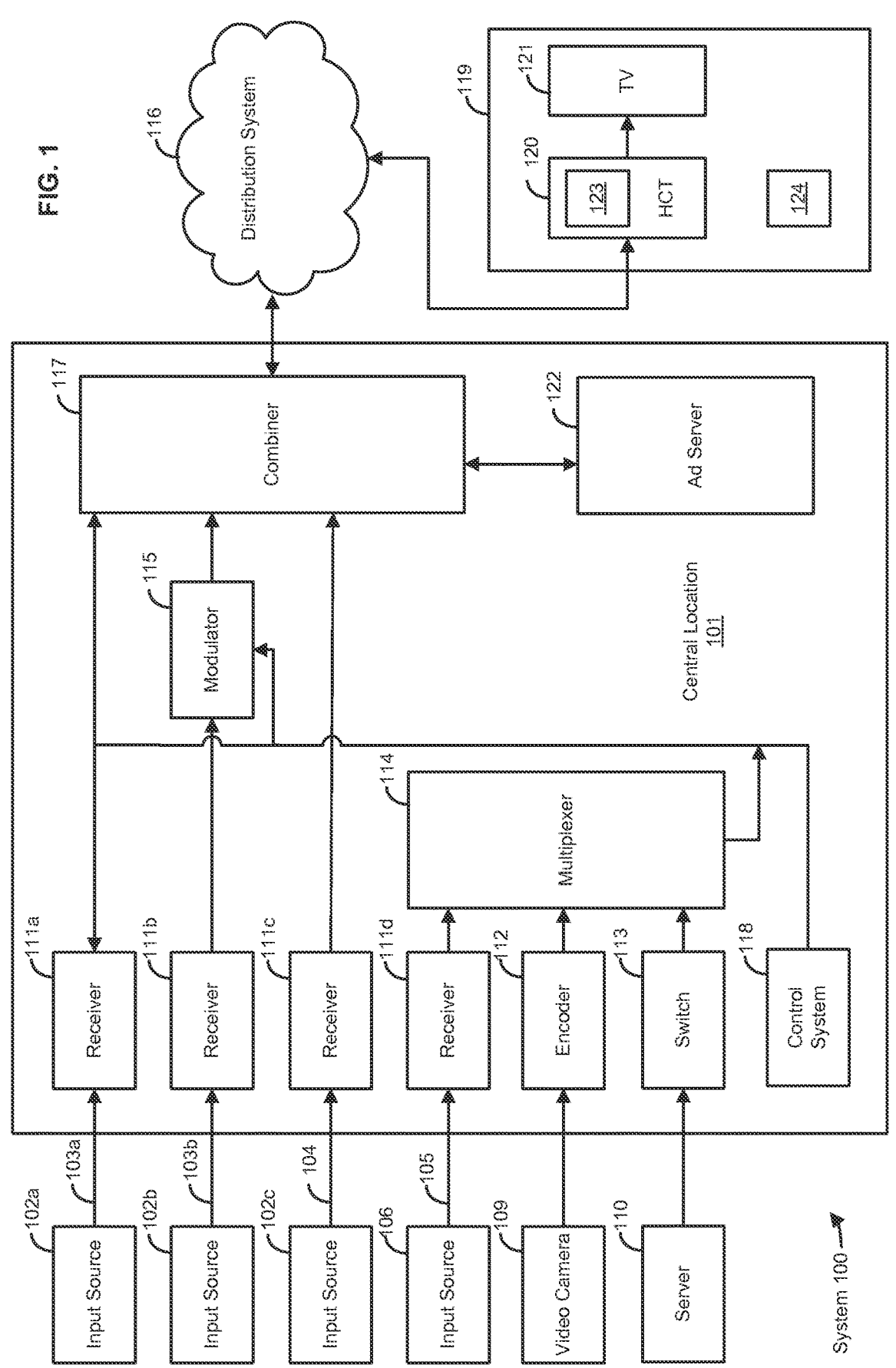
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for targeted content delivery. In an aspect, a device (such as a computing device, wireless router, and the like) can be configured to establish a plurality of coverage zones at a plurality of ranges. For example, a first coverage zone can be configured to have a range of 20 feet while a second coverage zone can be configured to have a range of 40 feet. The two coverage zones can be overlapping, whereby the first 20 feet of the second coverage zone overlaps with the first coverage zone, for example. A location of a user device can be detected as being inside the first coverage zone (inclusive of the second coverage zone) or as being inside the second coverage zone (exclusive of the first coverage zone). As a result of determining the user device location, the methods and systems can determine one or more preferences associated with the user device (and/or user) and deliver targeted content based on those preferences. The methods and systems can be applied to determining locations for a plurality of devices in a plurality of zones. In an aspect, the methods and systems can determine that a user is within the first coverage zone at a first time. In a further aspect, the methods and systems can determine that the user has exited the first coverage zone and is in a second coverage zone at a second time.

FIG. 1 illustrates various aspects of an exemplary system in which the present methods and systems can operate. The present disclosure relates to a method for detecting user presence and absence and delivering advertisements based on the detected presence or absence. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a network device, such as a gateway or home communications terminal (HCT) 120 can decode, if needed, the signals for display on a display device, such as on a display 121, such as a television set (TV) or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, displays 121, central locations 101, DVR's, home theater PC's, and the like. The one or more HCT's 120 can transmit signals to create zones. In an aspect, an HCT 120 can broadcast a weak Bluetooth beacon. If a user device 124 responds to the weak Bluetooth beacon, then the user of the user device 124 can be considered within a short range zone. The short range zone can be created such that any user associated with a user device within the short range zone can be presumed to be in front of a display 121 associated with the HCT 120. The short range zone can be created such that any user associated with a user device outside of the short range zone can be presumed to not be in front of a display 121 associated with the HCT 120. In an aspect, the HCT 120 can subsequently broadcast a Bluetooth beacon stronger than the weak Bluetooth beacon. If a user device 124 responds to the stronger Bluetooth beacon, then the user of the user device 124 can be considered within a long range zone.

In an aspect, user location 119 is not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within one or more HCT's 120. The HCT 120 can be in communication with one or more user devices 124. The HCT 120 can have logic 123. The logic 123 in the HCT 120 can monitor the content presented on the display 121. The logic 123 in the HCT 120 can detect the one or more user devices 124 present. The logic 123 in the HCT 120 can create and/or access one or more profiles corresponding to one or more user devices 124 based on the content presented on the display 121 when the one or more user devices is determined to be present. In another aspect, the one or more profiles can reside on a computing device such an advertisement server 122, which can store or have access to advertisements and/or alternate content. The logic 123 in the HCT 120 can be in communication with the advertisement server 122 and can cause targeted advertising and/or alternate content to be delivered to the HCT 120 based the on one or more profiles associated with the one or more user devices 124 determined to be near the HCT 120. For example, a profile approximating a 18-24 year old male can be associated with a user device 124 determined to be near the HCT 120. In an aspect, a motorcycle advertisement can be delivered to a display 121 associated with the HCT 120. In an aspect, a recommendation to change the channel to a mixed martial arts match currently airing can be presented to the display 121. In another aspect, the display 121 can be automatically tuned to the channel currently airing the mixed martial arts match. In an aspect, a recommendation of an action movie available on video on-demand can be presented to the display 121. In another aspect, the action movie can automatically begin playing on the display 121.

In an aspect, the gateway, or another HCT. 120 can create a zone by transmitting a signal. As an example, the signal can be a Bluetooth beacon. In an aspect, the transmitted signal can cause a user device to transmit an acknowledgement. In an aspect, a user device can be said to be in the zone if the user device receives the signal and transmits an acknowledgement. In an aspect, the HCT 120 can create a first zone at a first time by transmitting a first signal with a first signal strength. In an aspect, the HCT 120 can create a second zone at a second time by transmitting a second signal with a second signal strength. In an aspect, the first signal strength can be set so that a user device 124 determined to be in the first zone of the HCT 120 can be presumed to be in front of the display 121. In an aspect, the first signal strength can be set so that a user device 124 not determined to be in the first zone of the HCT 120 can be presumed to be not in front of the display 121. In an aspect, the second signal strength can be set so that the second zone comprises the first zone and that a user device 124 determined to be in the second zone of the HCT 120 cannot necessarily be presumed to be in front of the display 121. In an aspect, the HCT 120 can toggle between transmitting the first signal with the first signal strength at a first time interval and the second signal with the second signal strength at a second time interval. In an example, a user device 124 can receive the first signal at the first time interval and transmit to the HCT 120 an acknowledgement in response. In the example, in response to receiving the acknowledgement, the HCT 120 can determine that a user associated with the user device 124 is in front of the display 121 and consuming the content presented on the display 121. In the example, the user device 124 can receive the second signal at the second time interval and transmit to the HCT 120 an acknowledgement in response. In the example, the HCT 120 can transmit a third signal with the first signal strength in response to toggling back after the second time interval ends. In the example, the HCT 120 can determine that the user device 124 has exited the first zone in response to receiving no acknowledgement for the first signal or the third signal. In the example, in response to determining that the user device 124 has exited the first zone, the HCT 120 can determine that the user associated with the user device 124 is no longer in front of the display 121 and no longer consuming content presented on the display 121.

In another aspect, a portion of the logic 123 can reside on the one or more user devices 124 and/or on a server located upstream from the HCT 120, such as the advertisement server 122. For example, the one or more user devices 124 can comprise an application that is programmed to implement all or a portion of the methods described herein. The one or more user devices 124 can be in communication with the advertisement server 122 through a communication network provided by the HCT 120 and/or another communication device.

The user device 124 can comprise transmission software 206. Transmission software 206 can be software that configures the user device 124 to be compatible with Bluetooth®, Bluetooth® Low Energy (BLE), WiFi, Zigbee, Xbee, or any protocol initiated by transmission of a device's presence. An HCT 120 can transmit and receive transmission data 207 to and from the user device 124. The logic 123 can use the transmission data 207 and the content displayed on the display 121 to create a profile for the user device 124. In an aspect, the logic 123 can determine a channel that is currently being viewed based on tuners in the HCT 120. In an aspect, the logic 123 can determine the content that is currently being viewed on the display 121 based on an electronic programming guide (EPG) or metadata. The logic 123 can consider the profile of the user device 124 present and cause the advertisement server 122 to present an advertisement on the display 121 based on the profile in logic 123. A determination can be made that the user device 124 is no longer present; in response, the advertisement server 122 can be caused to no longer consider the profile of the user device 124 in selecting advertisements to be presented in the content on display 121.

Figure 2:
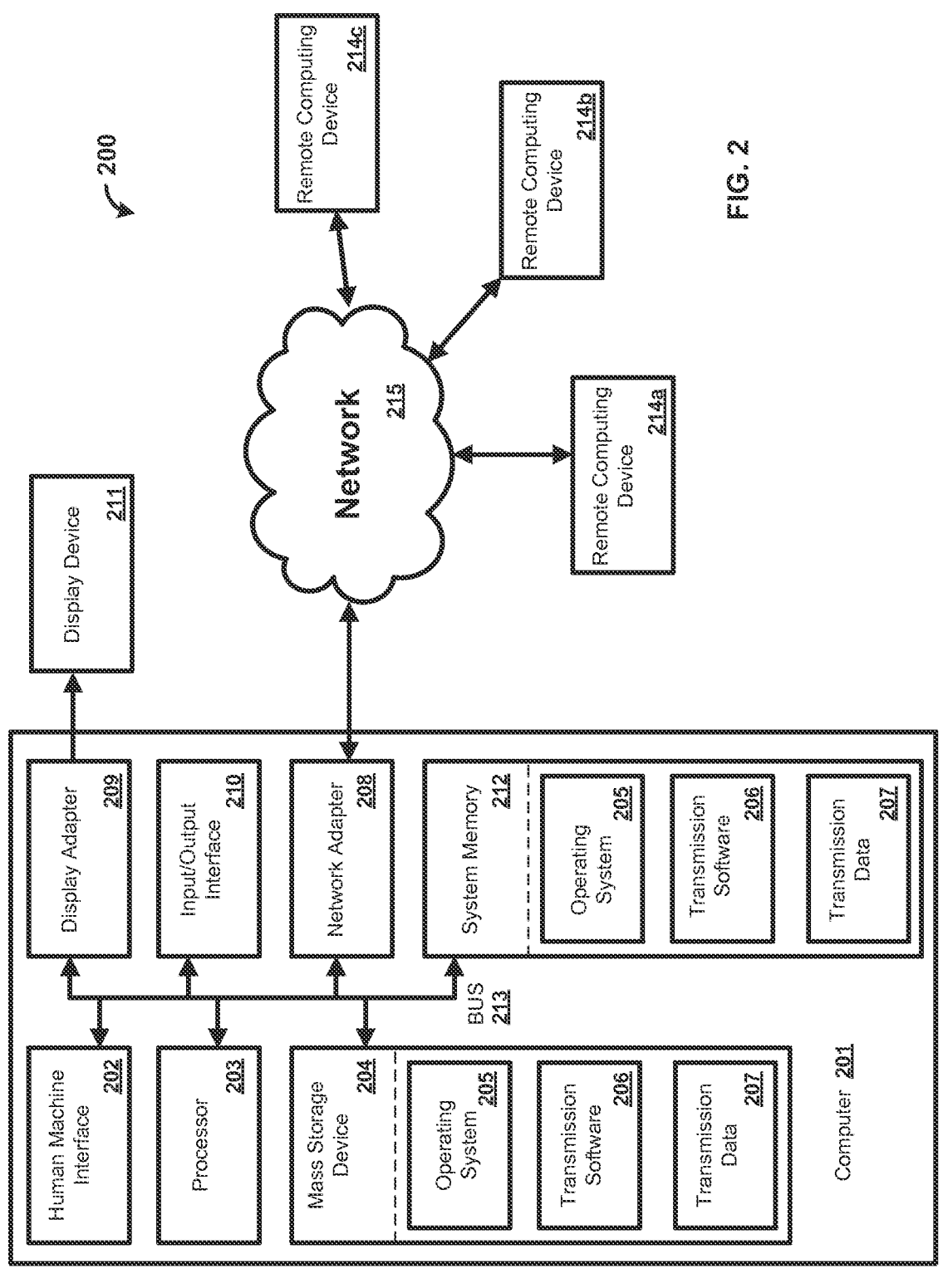
FIG. 2 is a block diagram of an exemplary computing device.

In an exemplary aspect, the methods and systems can be implemented on a computer 201 as illustrated in FIG. 2 and described below. By way of example, user device 124 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, transmission software 206, transmission data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as transmission data 207 and/or program modules such as operating system 205 and transmission software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and transmission software 206. Each of the operating system 205 and transmission software 206 (or some combination thereof) can comprise elements of the programming and the transmission software 206. Transmission data 207 can also be stored on the mass storage device 204. Transmission data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214*a,b,c*. By way of example, a remote computing device can be a personal computer, portable computer, smartphone, a server, a router, a network computer, a peer device or other common network node, and so on. Logical connections between the computer 201 and a remote computing device 214*a,b,c* can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of transmission software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
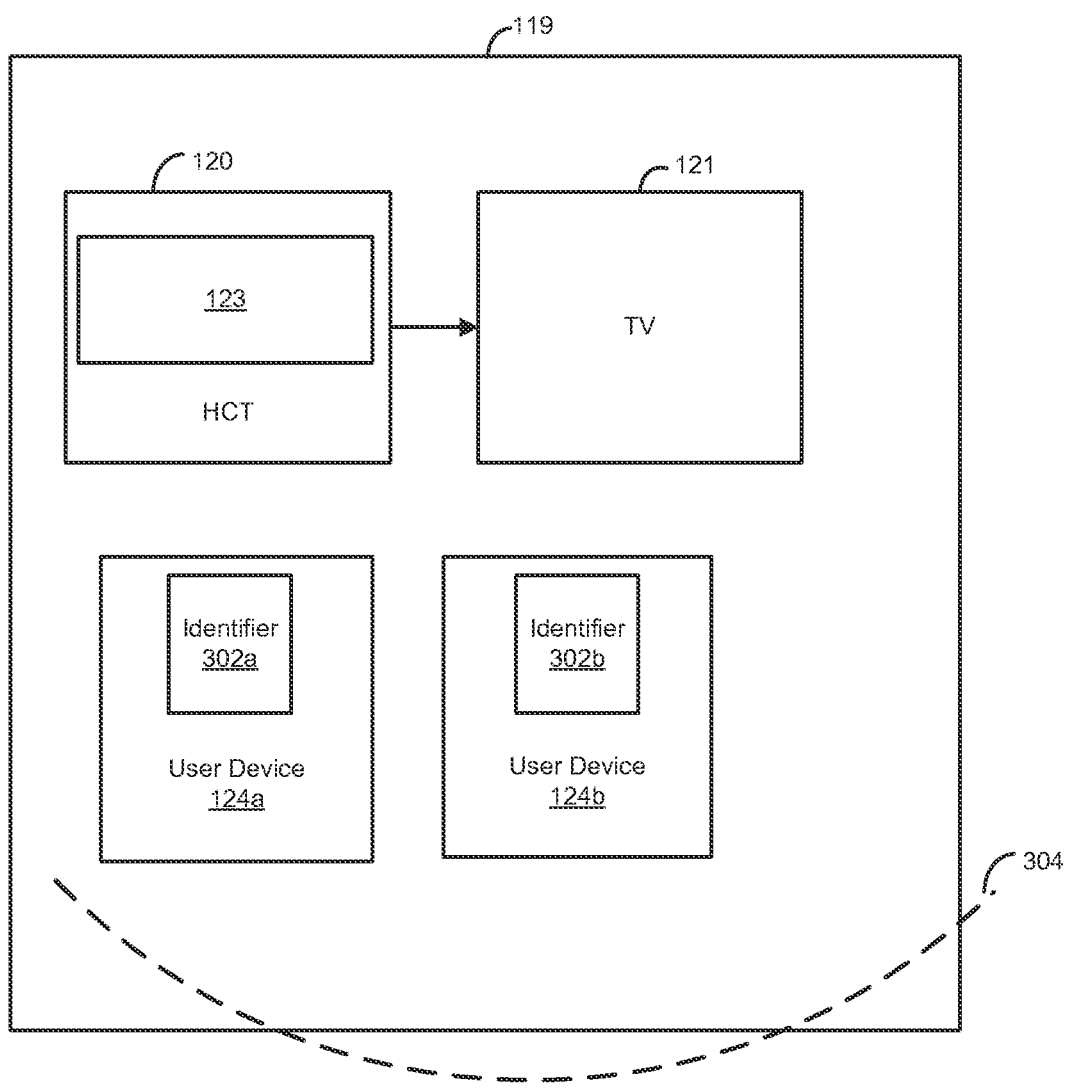
FIG. 3 is a block diagram of an exemplary system.
Figure 3:

FIG. 3 illustrates an exemplary system deployed at user location 119. An HCT 120 in the user location 119 can alternate transmitting a signal with a short range 304 and a signal with a long range 306. The short range 304 can be less than the long range 306. The signal with the short range 304 can be transmitted at a first time interval and the signal with the long range 306 can be transmitted at a second time interval. A first identifier can be associated with the signal with the short range 304. In an aspect, the first identifier can comprise a beacon identifier. The first identifier can comprise an identifier associated with Bluetooth®, Bluetooth® Low Energy (BLE), WiFi, Zigbee, Xbee, or any protocol initiated by transmission of a device's presence. A second identifier can be associated with the signal with the long range 306. In an aspect, the second identifier can comprise a beacon identifier. The second identifier can comprise an identifier associated with Bluetooth®, Bluetooth® Low Energy (BLE), WiFi, Zigbee, Xbee, or any protocol initiated by transmission of a device's presence.

In response to receiving a transmission of the signal with the short range 304, one or more user devices 124a, 124b can transmit one or more device identifiers 302a, 302b to HCT 120. In another aspect, in response to receiving a transmission of a signal with the short range 304, one or more devices 124a, 124b can transmit one or more device identifiers 302a, 302b to a server, such as the advertisement server 122. The server can transmit the one or more device identifiers 302a, 302b to the HCT 120. In yet another aspect, HCT 120 can receive a transmission of the one or more device identifiers 302a, 302b from the one or more user devices 124a, 124b. In an aspect, in response to receiving the transmission of the one or more device identifiers 302a, 302b, the HCT 120 can transmit the one or more device identifiers 302a, 302b to a server, such as the advertisement server 122. The one or more device identifiers 302a, 302b can be any identifier that uniquely identifies a corresponding user device 124a, 124b. In an aspect, the signal with the short range 304 can be set to a range such that a user associated with a user device within the range can be assumed to be consuming content on display 121. For example, a range within about 1 foot to about 10 feet. In an aspect, the short range 304 can be set to a range such that a user associated with a user device outside the range can be assumed not to be consuming content on display 121. For example, beyond about 10 feet.

When one or more user devices 124a. 124b is within the short range 304, the logic 123 can determine if corresponding profiles exist. A profile can correspond to one user device, such as user device 124a. A profile can correspond to a set of user devices, such as user device 124a and user device 124b. If a corresponding profile exists for the one or more user devices 124a, 124b within the short range 304, then the logic 123 can access the one or more corresponding profiles. If a corresponding profile does not exist for the one or more user devices 124a, 124b within the short range 304, then the logic 123 can create one or more corresponding profiles. The logic 123 can approximate the demographic for a profile without knowledge of a user associated with a user device by monitoring the content presented on the display 121. The logic 123 can detect the presence of a user device and/or a set of user devices which have a corresponding accessed profile. In an aspect, the corresponding accessed profile can be stored locally or remotely. In response detecting an accessed profile, an advertisement server 122 can be prompted to provide a corresponding advertisement to the content presented on display 121. In an aspect, the HCT 120 can make advertisement and/or program recommendations based on the detected accessed profile.

FIG. 4 illustrates an exemplary database in accordance with the provided systems and methods. In the exemplary database, a profile field 402 can be a key. The profile field for an entry can be populated with an identifier associated with a user device, such as device identifier 302a associated with user device 124a. The profile field for an entry can be populated with a plurality of identifiers associated with a plurality of user devices, such as 302a and 302b associated with 124a and 124b, respectively. An entry can additionally have one or more fields for associating content viewed with the entry's profile, such as field 404. Optionally, one or more fields can track attributes about a user. In an aspect, attributes about a user can comprise affinities for brands, products, sports, sports leagues, sports teams, shows, movies, show genres, movie genres, performers, networks, genres, musicians, music genres, and the like. In an aspect, attributes about a user can comprise viewing habits, such as a volume or volume range content at which is consumed, a tendency to binge watch, a time and/or a day content is consumed, a channel changing tendency, a propensity to watch a particular show, movie, sport, sports league, sports team, network, performer, genre, and the like. Finally, an entry can have one or more fields for associating a predicted demographic with the entry's profile, such as field 406. Demographic information can relate to a user's age or age range, income or income range, gender, race, ethnicity, education level, number of children in a household, or any other demographic information.

For example, if the user device 124a associated with device identifier 302a is detected within the short range 304 and the content presented to display 121 is determined to be predominantly football and action movies, then the logic 123 can predict that the demographic of the user associated with device identifier 302a is a male between the ages of 18 and 35. In an aspect, the logic 123 can transmit the observed content to an external server which can return a predicted demographic to the logic 123 for the transmitted observed content. In an aspect, the logic 123 can predict the demographic information locally. The advertisement server 122 can be caused to present advertisements targeted to males between 18 and 35 in response to the detection that the user device 124a associated with device identifier 302a is within the short range 304.

In an aspect, the systems and methods herein can predict the demographic information based on the intended target of the content. In an aspect, information other than content can be used to determine the target of the content. For example, certain channels cater to certain demographics (e.g., male watching ESPN, kid watching Disney channel, etc). In an aspect, the systems and methods can determine the targeted demographics of the content by examining metadata associated with content on a tuned channel. In an aspect, the systems and methods can determine the targeted demographics of the content by examining an electronic programming guide entry for the content on a tuned channel. In an aspect, the determined targeted demographics can be factored into consideration for the profiles of the devices within the short range 304.

For example, if the user device 124b associated with device identifier 302b is detected within the short range 304 and the content presented to display 121 is determined to be predominantly cooking shows and soap operas, then the logic 123 can predict that the demographic of the user associated with device identifier 302b is a female between the ages of 24 and 45. The advertisement server 122 can be caused to present advertisements targeted to females between 24 and 45 in response to the detection that the user device 124b associated with device identifier 302b is within the short range 304.

For example, if the user devices 124a and 124b associated with device identifiers 302a and 302b are determined to be within the short range 304 and the content presented to display 121 is determined to be predominantly sitcoms and crime dramas, then the logic 123 can predict that the demographic of the users associated with device identifiers 302a, 302b are people between the ages of 18 and 45. In an aspect, in creating a profile with multiple identifiers, such as the profile of device identifiers 302a and 302b, the logic 123 can consider the profiles of the individual identifiers, such as the profile of device identifier 302a and the profile of device identifier 302b. In an aspect, in creating a profile with multiple device identifiers, such as the profile of 302a and 302b, the logic 123 can refrain from considering the profiles of the individual identifiers, such as the profile of device identifier 302a and the profile of device identifier 302b. The advertisement server 122 can be caused to present advertisements targeted to people between 18 and 45 in response to the detection that the user devices 124a, 124b associated with device identifiers 302a, 302b are within the short range 304.

Figure 5:
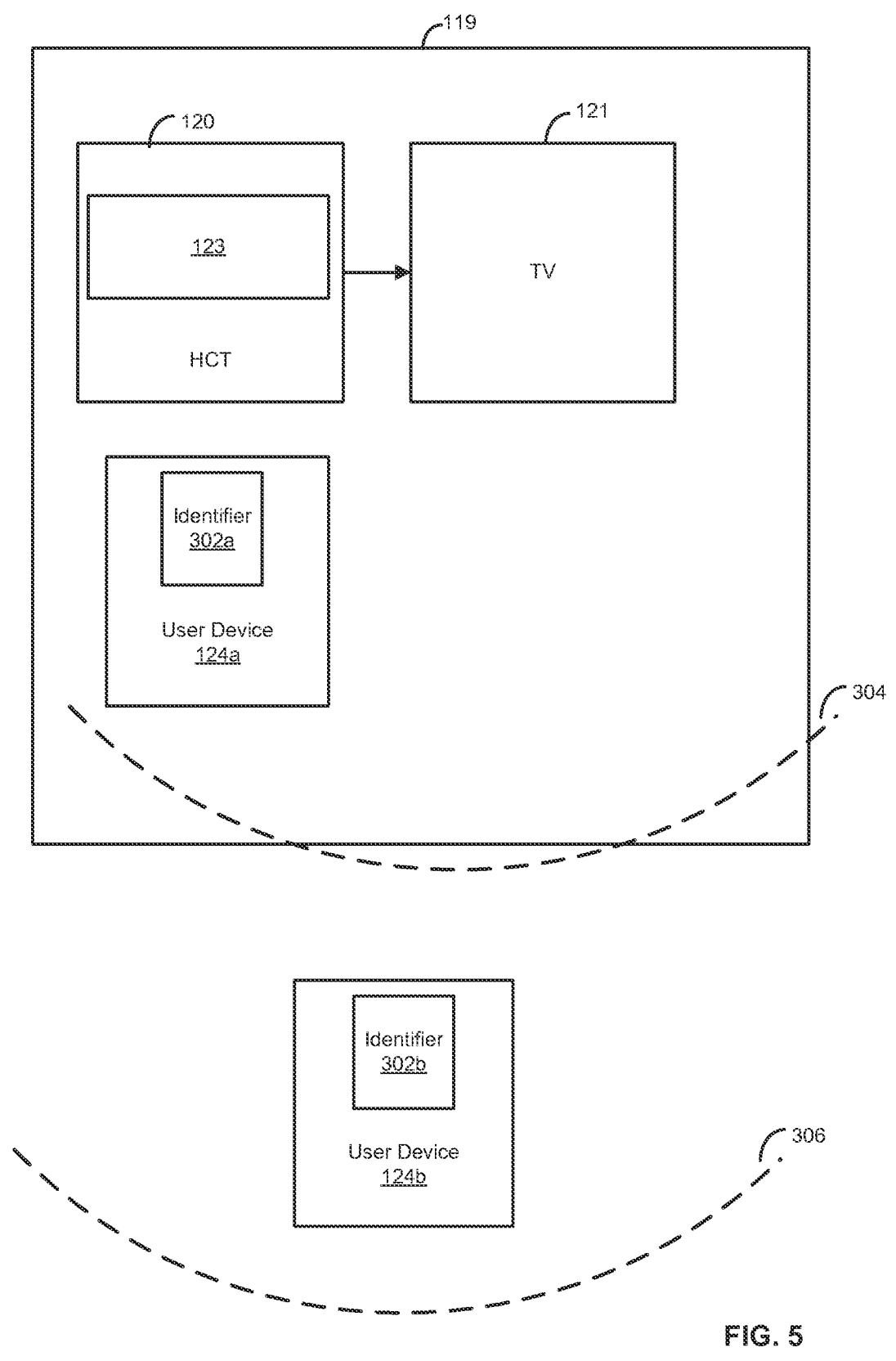

FIG. 5 illustrates an exemplary system deployed at user location 119. In an aspect, the HCT 120 can transmit the first signal with the short range 304 at a first time interval and the second signal with the long range 306 at a second time interval. In an aspect, the HCT 120 can toggle between transmitting the first signal and the second signal. In an aspect, at the first time interval, a user device 124b can receive the first signal with the short range 304 wherein the first signal comprises a first identifier. In an aspect, the user device 124b can transmit an acknowledgement to the HCT 120 in response to receiving the first signal. In an aspect, the user device 124b can transmit an acknowledgement to a server, such as advertisement server 122, in response to receiving the first signal, wherein the server can forward the acknowledgement to the HCT 120. In an aspect, the HCT 120 can know that the user device 124b is in viewing range of the display 121 when the HCT 120 receives the acknowledgement. In an aspect, the first identifier can comprise a beacon identifier. The user device 124b can continue to attempt to receive communications from signals bearing the first identifier, even when the user device 124b is outside of the short range 304. The user device 124b can discontinue attempting to receive communications from signals bearing the first identifier after the user device 124b receives a signal with another identifier, such as the signal with the long range 306 that comprises a second identifier and is transmitted at the second time interval. In an aspect, the second identifier can comprise a beacon identifier. In an aspect, the user device 124b can transmit an acknowledgement to the HCT 120 in response to receiving the second signal. In an aspect, the user device 124b can transmit an acknowledgement to a server, such as advertisement server 122, in response to receiving the second signal, wherein the server can forward the acknowledgement to the HCT 120. In an aspect, the HCT 120 can transmit a third signal with the short range 304 in response to the second time interval ending. If the user device 124b is not within the short range 304, the user device 124b will not receive the first (or third) signal and will not attempt to receive communication signals bearing the first identifier. The HCT 120 can know that the user device 124b has exited the short range 304 because the HCT 120 is no longer receiving acknowledgments from the user device 124b from the first signal. Toggling between signals allows the user device 124b to receive signals from the HCT 120 while allowing the HCT 120 to determine that the user device 124b is not within the short range 304. Additionally, toggling the between signals allows both the HCT 120 and the user device 124b to both determine that the user device 124b is no longer within the short range 304, whereas otherwise the user device 124b would try to continue to maintain communication via the signal with the short range 304.

Figure 6:
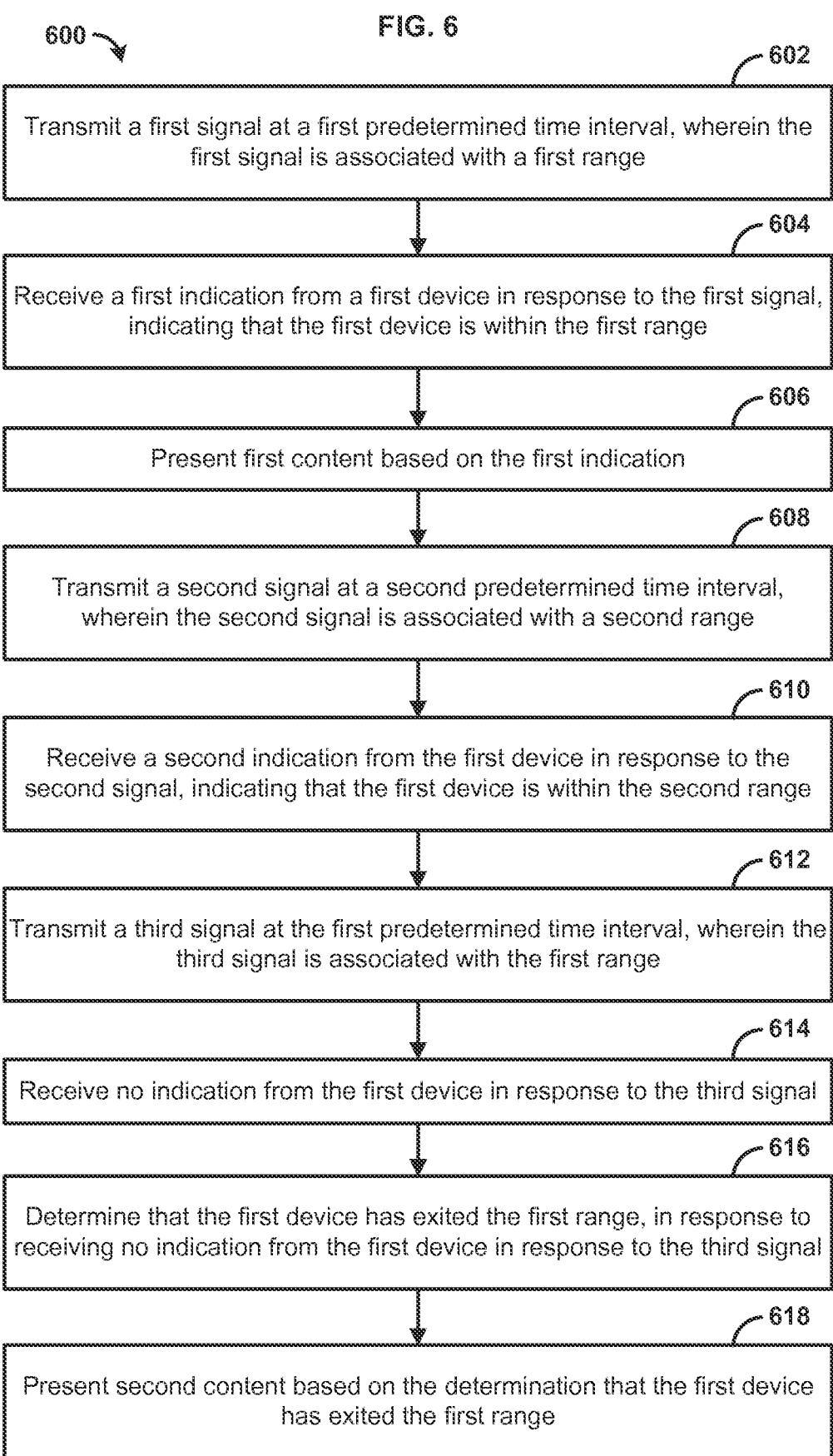
FIG. 6 is a flow chart of an exemplary method.

FIG. 6 is a flowchart illustrating an example method 600. At 602, a first signal can be transmitted at a first predetermined time interval, wherein the first signal is associated with a first range. The first signal can comprise, for example, a beacon identifier. The first signal can comprise an identifier associated with Bluetooth®, Bluetooth® Low Energy (BLE), WiFi, Zigbee, Xbee, or any protocol initiated by transmission of a device's presence. In an aspect, the first signal can be transmitted from an HCT 120 to a user device 124. The first predetermined time interval can be, for example, 10 seconds, although any time interval can be used.

At 604, a first indication can be received from a first device in response to the first signal, indicating that the first device is within the first range. The first range can be, for example, 10 feet, although any range can be used. In an aspect, the first range can be the short range 304 and a user associated with the user device 124 can be presumed to be in front of the display 121. At 606, first content can be presented based on the first indication. In an aspect, the first indication can comprise an identifier for a profile associated with a device or a user. In an aspect, a profile associated with a user presumed to be in front of the display 121 can influence advertisements delivered in first content and served to the display 121 by the advertisement server 122. In an aspect, content displayed on the display 121 can be used to shape the profile of a user presumed to be in front of the display 121. In an aspect, the first indication can comprise a request to connect in response to a received beacon identifier. In an aspect, the first indication can comprise a message sent in response to receiving an identifier associated with Bluetooth®, Bluetooth® Low Energy (BLE), WiFi, Zigbee, Xbee, or any protocol initiated by transmission of a device's presence. In an aspect, the first device can be a user device 124. In an aspect, the HCT 120 can receive the first indication. In an aspect, the user device 124 can transmit the first indication to a server, such as the advertisement server 122, and the server can transmit the first indication to the HCT 120.

At 608, a second signal can be transmitted at a second predetermined time interval, wherein the second signal is associated with a second range. The second signal can comprise, for example, a beacon identifier. The second signal can comprise an identifier associated with Bluetooth®, Bluetooth® Low Energy (BLE), WiFi, Zigbee, Xbee, or any protocol initiated by transmission of a device's presence. In an aspect, the second signal can be transmitted from the HCT 120 to the user device 124. The second predetermined time interval can be, for example, 10 seconds, although any time interval can be used. In an aspect, the first predetermined time interval and the second time interval can be the same. At 610, a second indication can be received from the first device in response to the second signal, indicating that the first device is within the second range. The second range can be, for example, 50 feet, although any range can be used. In one aspect, the second range can comprise the first range. In another aspect, the second range can comprise a portion that is exclusive of the first range. In an aspect, the second range can be the long range 306 and a user associated with the user device 124 may not necessarily be presumed to be in front of the display 121. In an aspect, the second indication can comprise a request to connect in response to a received beacon identifier. In an aspect, the second indication can comprise a message sent in response to receiving an identifier associated with Bluetooth®, Bluetooth® Low Energy (BLE), WiFi, Zigbee, Xbee, or any protocol initiated by transmission of a device's presence. In an aspect, the HCT 120 can receive the second indication. In an aspect, the user device 124 can transmit the second indication to a server, such as the advertisement server 122, and the server can transmit the second indication to the HCT 120.

At 612, a third signal can be transmitted at the first predetermined time interval, wherein the third signal is associated with the first range. The third signal can comprise, for example, a beacon identifier. The third signal can comprise an identifier associated with Bluetooth®, Bluetooth® Low Energy (BLE), WiFi, Zigbee, Xbee, or any protocol initiated by transmission of a device's presence. In an aspect, the third signal can be transmitted from the HCT 120 to the user device 124. The first predetermined time interval can be, for example, 10 seconds, although any time interval can be used. At 614, an indication from the first device may not be received in response to the third signal. In an aspect, the HCT 120 can expect to receive an indication from each device in the first range during the third time period. At 616, a determination can be made that the first device has exited the first range in response to receiving no indication from the first device in response to the third signal. For example, an indication in response to the third signal can be expected within a certain time window. If no response is received with the time window, then the first device is no longer within the first range. Alternatively, after receiving no indication in response to the third signal, a fourth signal can be transmitted, wherein the fourth signal is associated with the second range. If an indication is received in response to the fourth signal (after receiving no indication in response to the third signal), then the first device is no longer in the first range, but is in the second range. Presence within various ranges can thus be implemented using varied signals transmitted at various times and strengths. In an aspect, a server, such as the advertisement server 122, can make the determination and transmit the determination to the HCT 120. In an aspect, a user associated with a device that has exited the first range can be presumed to be no longer in front of display 121. At 618, second content can be presented based on the determination that the first device has exited the first range. In an aspect, a profile associated with a user presumed to be no longer in front of the display 121 can cease to influence advertisements served to the display 121 by the advertisement server 122. In an aspect, second content displayed on the display 121 can cease to be used to shape the profile of a user presumed to be no longer in front of the display 121. In an aspect, an advertisement to be placed in the second content can be determined, wherein the advertisement is not based on the first profile.

In an aspect, the first indication can comprise a first identifier associated with the first device. In a further aspect, a profile associated with the first identifier can be retrieved. If no profile associated with the first identifier exists, then a profile associated with the first identifier can be created. In an aspect, a profile can be associated with a set of identifiers. In an aspect, content can be presented and a plurality of attributes associated with the content can be determined. The plurality of attributes associated with the content can be determined based on metadata. The plurality of attributes associated with the content can be determined based on information from an electronic programming guide (EPG). A profile can associate the plurality of attributes with the first identifier associated with the first device. In yet a further aspect, the method can determine an advertisement to be presented based, at least in part, on the profile associated with the first identifier. In one aspect, the advertisement may not be based on the first profile.

In one aspect, a third indication can be received from a second device in response to the first signal, indicating that the second device is within the first range. In an aspect, a second identifier associated with the second device can be received. In a further aspect, content can be presented. A price associated with the first content can be determined based at least on the first identifier and the second identifier. For example, a content provider can charge a bar a price for a pay-per-view event based on the number of detected identifier associated with devices. The first identifier can be associated with the first profile, and the second identifier can be associated with a second profile. In an aspect, a third profile can be associated with the combination of the first profile and the second profile. A first advertisement presented in the first content can be determined based, at least in part, on the first profile and the second profile, after reception of the first indication and the third indication. In one aspect, a fourth indication can be received from the second device in response to the third signal, indicating that the second device is within the first range. A second advertisement presented in the second content can be determined based, at least in part, on the second profile after reception of the fourth indication. In an aspect, the second advertisement may not be based on the first profile.

FIG. 7 is a flowchart illustrating an example method 700. At 702, a first signal can be received by a first device at a first time interval. In an aspect, the first device can be a user device 124. The first signal can comprise, for example, a beacon identifier. The first signal can comprise an identifier associated with Bluetooth®, Bluetooth® Low Energy (BLE), WiFi, Zigbee, Xbee, or any protocol initiated by transmission of a device's presence. In an aspect, the first signal can be transmitted from an HCT 120 to a user device 124. The first predetermined time interval can be, for example, 10 seconds, although any time interval can be used. At 704, a first indication can be transmitted by the first device in response to the first signal, indicating a first position of the first device within a first range. In an aspect, the first indication can cause first content to be presented on a second device. In an aspect, the first content presented can be determined by the indication that the first device is within the first range. The first range can be, for example, 10 feet, although any range can be used. In an aspect, the first range can be the short range 304 and a user associated with the user device 124 can be presumed to be in front of the display 121. In an aspect, a profile associated with a user presumed to be in front of the display 121 can influence advertisements served to the display 121 by the advertisement server 122. In an aspect, content displayed on the display 121 can be used to shape the profile of a user presumed to be in front of the display 121. In an aspect, the first indication can comprise a request to connect in response to a received beacon identifier. In an aspect, the first indication can comprise a message sent in response to receiving an identifier associated with Bluetooth®, Bluetooth® Low Energy (BLE), WiFi, Zigbee, Xbee, or any protocol initiated by transmission of a device's presence. In an aspect, the first device can be a user device 124. In an aspect, the HCT 120 can receive the first indication. In an aspect, the user device 124 can transmit the first indication to a server, such as the advertisement server 122, and the server can transmit the first indication to the HCT 120.

At 706, a second signal can be received by the first device at a second time interval. The second signal can comprise, for example, a beacon identifier. The second signal can comprise an identifier associated with Bluetooth®, Bluetooth® Low Energy (BLE), WiFi, Zigbee, Xbee, or any protocol initiated by transmission of a device's presence. In an aspect, the second signal can be transmitted from the HCT 120 to the user device 124. The second predetermined time interval can be, for example, 10 seconds, although any time interval can be used. At 708, a second indication can be transmitted by the first device in response to the second signal, indicating a second position of the first device within a second range. The second range can be, for example, 50 feet, although any range can be used. In one aspect, the second range can comprise the first range. In another aspect, the second range can comprise a portion that is exclusive of the first range. In an aspect, the second range can be the long range 306 and a user associated with the user device 124 may not necessarily be presumed to be in front of the display 121. In an aspect, the second indication can comprise a request to connect in response to a received beacon identifier. In an aspect, the second indication can comprise a message sent in response to receiving an identifier associated with Bluetooth®, Bluetooth® Low Energy (BLE), WiFi, Zigbee, Xbee, or any protocol initiated by transmission of a device's presence. In an aspect, the HCT 120 can receive the second indication. In an aspect, the user device 124 can transmit the second indication to a server, such as the advertisement server 122, and the server can transmit the second indication to the HCT 120. At 710, a determination can be made by the first device that the second position is not in the first range, wherein the second range comprises the first range. In an aspect, the HCT 120 can transmit a third signal at the first predetermined time interval. In an aspect, the determination can be made in response to a failure to receive the third signal. In an aspect, the determination can be made in response to polling the first device to determine the last signal received and determining that the third signal was not the last signal received. In an aspect, a server, such as the advertisement server 122, can make the determination and transmit the determination to the user device 124. In an aspect, a user associated with a device that is in the second position which is not in the first range can be presumed to be no longer in front of display 121. At 712, a notification that the first device is not in the first range can be transmitted by the first device to a third device. In an aspect, the notification can cause second content to be presented on the second device. In an aspect, the second content presented can be determined by the determination that the first device is not in the first range. In an aspect, a profile associated with a user presumed to be no longer in front of the display 121 can cease to influence advertisements served to the display 121 by the advertisement server 122. In an aspect, content displayed on the display 121 can cease to be used to shape the profile of a user presumed to be no longer in front of the display 121.

In one aspect, an identifier can be transmitted by the first device in response to the first signal. In a further aspect, content can be presented on a second device. In an aspect, a plurality of attributes can be associated with the first content. In an aspect, a profile can be associated with the plurality of attributes and the identifier. The second device can be, for example, the HCT 120, the display 121, and/or another user device 124. Presentation of the content can be caused by the first device being located at either of the first location or the second location. One or more advertisements can be presented in the content depending on whether the first device is located at the first location or the second location. In one aspect, a first advertisement to be presented in the first content after transmission of the first indication can be based, at least in part, on the profile. In yet another aspect, a second advertisement to be presented in the content after the determination that the second position is not in the first range may not be based on the profile.

FIG. 8 is a flowchart illustrating an example method 800. At 802, a first profile can be accessed. In an aspect, the first profile can be a stored profile (e.g., stored locally or remotely). The first profile can comprise a first identifier associated with a first device or a first user, and a first plurality of attributes. In an aspect, the first identifier can be associated with the first user based on an association of the first user with the first device. In an aspect, a profile associated with a single user can be associated with multiple identifiers, each identifier associated with a device. In an aspect, the first plurality of attributes can be associated with one or more content items. In an aspect, the first plurality of attributes can be associated with one or more preferences. In an aspect, the first plurality of attributes can be associated with one or more likes. In an aspect, the first plurality of attributes can be associated with one or more dislikes. The first device can be a user device, such as a tablet, smart phone, laptop, or any other portable communication device. The first plurality of attributes can comprise genre, title, cast, crew, any other attributes associated with content, or any combination of the foregoing. The first identifier can comprise, for example, a media access control address (MAC address). The first identifier can comprise a beacon identifier. In an aspect, the first identifier can comprise a message sent in response to receiving an identifier associated with Bluetooth®, Bluetooth® Low Energy (BLE), WiFi, Zigbee, Xbee, or any protocol initiated by transmission of a device's presence. In an aspect, the advertisement server 122 can store or access profiles in a database. In an aspect, an HCT 120 can detect a user device 124 and forward the first identifier associated with the user device 124 to the advertisement server 122. In an aspect, the user device 124 can forward the first identifier to the advertisement server 122.

At 804, a first current identifier associated with a first current device can be received in response to the first current device entering a first range. In an aspect, the first current device can be a user device, such as a tablet, smart phone, laptop, or any other portable communication device. In an aspect, the first current identifier can comprise, for example, a media access control address (MAC address). The first identifier can comprise a beacon identifier. In an aspect, the first identifier can comprise a message sent in response to receiving an identifier associated with Bluetooth®, Bluetooth® Low Energy (BLE), WiFi, Zigbee, Xbee, or any protocol initiated by transmission of a device's presence. The first range can be, for example, 10 feet, although any range can be used. In an aspect, the first range can be the short range 304 and a user associated with the user device 124 can be presumed to be in front of the display 121. In an aspect, a profile associated with a user presumed to be in front of the display 121 can influence advertisements served to the display 121 by the advertisement server 122. In an aspect, content displayed on the display 121 can be used to shape the profile of a user presumed to be in front of the display 121. In an aspect, an HCT 120 can detect a user device 124 and forward the first current identifier associated with the user device 124 to the advertisement server 122. In an aspect, the user device 124 can forward the first current identifier to the advertisement server 122. At 806, the first identifier can be matched with the first current identifier. In an aspect, the advertisement server 122 can search a database by the first current identifier and retrieve the first profile with the first identifier as the key.

At 808, a first advertisement or other first content can be presented based on the first plurality of attributes of the first profile associated with the first identifier matching the first current identifier. In an aspect, the advertisement server 122 can query a second database and/or second table with the retrieved plurality of attributes to retrieve a predicted demographic. In an aspect, a predicted demographic can be a field in the first database. In a further aspect, the predicted demographic can be used to query another database to retrieve the first advertisement. In an aspect, the first advertisement can be associated with the predicted demographic, wherein the predicted demographic is based on the plurality of attributes in the first profile. At 810, an indication that the first current device has exited the first range can be received. In an aspect, a determination can be made that the first device has exited the first range, in response to receiving no indication that the first device did not respond to a signal. In an aspect, a server, such as the advertisement server 122, can make the determination by receiving an indication from the HCT 120 of the last signal sent and polling the user device 124 for the last signal received. In an aspect, a server, such as the advertisement server 122, can make the determination by receiving an indication from the HCT 120 of the last signal sent and receiving an indication from the user device 124 for the last signal received. In an aspect, the HCT 120 can make the determination by receiving no indication from the user device 124 in response to transmitting a signal. In an aspect, the HCT 120 can transmit the determination to the advertisement server 122. In an aspect, a user associated with a device that has exited the first range can be presumed to be no longer in front of display 121. At 812, a second advertisement or other second content can be presented based on the indication. In an aspect, a profile associated with a user presumed to be no longer in front of the display 121 can cease to influence advertisements served to the display 121 by the advertisement server 122. In an aspect, content displayed on the display 121 can cease to be used to shape the profile of a user presumed to be no longer in front of the display 121.

In an aspect, a second profile can be accessed, wherein the second profile can comprise a second identifier associated with a second device, and a second plurality of attributes. In an aspect, the second profile can be a stored profile. In an aspect, the second identifier can be associated with the second user based on an association of the second user with the second device. In an aspect, a profile associated with a single user can be associated with multiple identifiers, each identifier associated with a device. In an aspect, the second plurality of attributes can be associated with one or more content items. In an aspect, the second plurality of attributes can be associated with one or more preferences. In an aspect, the second plurality of attributes can be associated with one or more likes. In an aspect, the second plurality of attributes can be associated with one or more dislikes. A second current identifier associated with a second current device can be received in response to the second current device entering the first range. The second identifier can be matched with the second current identifier, in a further aspect. In a further aspect, the first advertisement presented at 808 can be determined based on the second plurality of attributes of the second profile. In an aspect, the second advertisement can be determined based on the second plurality of attributes of the second profile. In a further aspect, the second advertisement may not be determined based on the first plurality of attributes of the first profile. In one aspect, a price associated with a media stream can be based at least on the first and second profiles.

In another aspect, the first current identifier associated with the first current device can be received in response to the current device entering a second range. The first identifier can be matched with the first current identifier. A third advertisement can be determined based on the first plurality of attributes of the first profile associated with the first identifier matching the first current identifier.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:

toggling between transmitting, by a computing device, a first signal associated with a first range from a location at a first time interval and transmitting, by the computing device, a second signal associated with a second range from the location at a second time interval, wherein the first signal comprises a first beacon identifier and a first signal strength that is received by a user device within the first range, and wherein the second signal comprises a second beacon identifier and a second signal strength that is received by the user device within the second range;

receiving, from the user device, based on the user device receiving the first beacon identifier of the first signal during the first time interval and based on the user device receiving the second beacon identifier of the second signal during the second time interval, a first indication of a response to the first signal and a response to the second signal, wherein the first indication indicates that the user device is within the first range, wherein the user device attempts to receive communications from signals comprising the first beacon identifier;

causing, by the computing device, based on the first indication, output of first content;

receiving, from the user device based on the user device not receiving the first beacon identifier of the first signal during the first time interval and based on the user device receiving the second beacon identifier of the second signal during the second time interval, a second indication of a second response to the second signal, wherein the second indication indicates that the user device is within the second range, wherein the user device discontinues the attempts to receive the communications from the signals comprising the first beacon identifier based on receiving the second indication; and causing, by the computing device, based on the second indication, output of second content.

2. The method of claim 1, wherein the response to the first signal comprises a first identifier associated with the user device.

3. The method of claim 2, further comprising:

determining a plurality of attributes associated with the first content; and creating, based on the plurality of attributes and the first identifier associated with the user device, a profile.

4. The method of claim 3, further comprising determining, based on the created profile, an advertisement to be presented in the first content.

5. The method of claim 2, further comprising:

receiving, from a second user device based on the second user device receiving at least one of the first beacon identifier of the first signal during the first time interval or the second beacon identifier of the second signal during the second time interval, a second identifier associated with the second user device.

6. The method of claim 5, further comprising:

determining, based on at least one of the first identifier or the second identifier, a price associated with the first content.

7. The method of claim 5, further comprising:

associating the first identifier with a first profile;

associating the second identifier with a second profile; and determining, based on the first profile and the second profile, a first advertisement to be presented in the first content.

8. The method of claim 7, further comprising:

receiving, from the second user device based on the second user device receiving at least one of the first beacon identifier of the first signal during the first time interval or the second beacon identifier of the second signal during the second time interval, a third response to the second signal; and determining, based on the second profile and the third response to the second signal, a second advertisement to be presented in the second content, wherein the second advertisement is not based on the first profile.

9. The method of claim 7, further comprising determining an advertisement to be placed in the second content, wherein the advertisement is not based on the first profile.

10. The method of claim 1, wherein the second range comprises the first range.

11. The method of claim 1, wherein the first time interval is different from the second time interval.

12. An apparatus, comprising:

one or more processors; and memory storing processor executable instructions that, when executed by the one or more processors, cause the apparatus to:

toggle between transmitting, by the apparatus, a first signal associated with a first range from a location at a first time interval and transmitting, by the apparatus, a second signal associated with a second range from the location at a second time interval, wherein the first signal comprises a first beacon identifier and a first signal strength that is received by a user device within the first range, and wherein the second signal comprises a second beacon identifier and a second signal strength that is received by the user device within the second range;

receive, from the user device, based on the user device receiving the first beacon identifier of the first signal during the first time interval and based on the user device receiving the second beacon identifier of the second signal during the second time interval, a first indication of a response to the first signal and a response to the second signal, wherein the first indication indicates that the user device is within the first range, wherein the user device attempts to receive communications from signals comprising the first beacon identifier;

cause, based on the first indication, output of first content;

receive, from the user device based on the user device not receiving the first beacon identifier of the first signal during the first time interval and based on the user device receiving the second beacon identifier of the second signal during the second time interval, a second indication of a second response to the second signal, wherein the second indication indicates that the user device is within the second range, wherein the user device discontinues the attempts to receive the communications from the signals comprising the first beacon identifier based on receiving the second signal; and cause, based on the second indication, output of second content.

13. The apparatus of claim 12, wherein the response to the first signal comprises a first identifier associated with the user device.

14. The apparatus of claim 13, wherein the processor executable instructions, when executed by the one or more processors, further cause the apparatus to:

determine a plurality of attributes associated with the first content; and create, based on the plurality of attributes and the first identifier associated with the user device, a profile.

15. The apparatus of claim 13, wherein the processor executable instructions, when executed by the one or more processors, further cause the apparatus to:

receive, from a second user device based on the second user device receiving at least one of the first beacon identifier of the first signal during the first time interval or the second beacon identifier of the second signal during the second time interval, a second identifier associated with the second user device.

16. The apparatus of claim 15, wherein the processor executable instructions, when executed by the one or more processors, further cause the apparatus to:

associate the first identifier with a first profile;

associate the second identifier with a second profile; and determine, based on the first profile and the second profile, a first advertisement to be presented in the first content.

17. The apparatus of claim 12, wherein the first time interval is different from the second time interval.

18. A method, comprising:

toggling between transmitting, by a computing device, a first signal associated with a first range from a location at a first time interval and transmitting, by the computing device, a second signal associated with a second range from the location at a second time interval, wherein the first signal comprises a first beacon identifier and a first signal strength that is received by a user device within the first range, and wherein the second signal comprises a second beacon identifier and a second signal strength that is received by the user device within the second range;

determining, based on a response to the first signal and a response to the second signal, a first indication that the user device is within the first range, wherein the user device sends the response to the first signal based on the user device receiving the first beacon identifier of the first signal during the first time interval, wherein the user device sends the response to the second signal based on the user device receiving the second beacon identifier of the second signal during the second time interval, wherein the user device attempts to receive communications from signals comprising the first beacon identifier;

causing, by the computing device, based on the first indication, output of first content;

determining, based on a second response to the second signal and no response to the first signal, a second indication that the user device has exited the first range, wherein the user device sends the second response to the second signal based on the user device receiving the second beacon identifier of the second signal during the second time interval, wherein the user device does not send a response to the first signal based on not receiving the first beacon identifier of the first signal during the first time interval, wherein the second indication indicates that the user device is within the second range, wherein the user device discontinues the attempts to receive the communications from the signals comprising the first beacon identifier based on receiving the second signal; and causing, by the computing device, based on the second indication, output of second content.

19. The method of claim 18, wherein the response to the first signal comprises an identifier associated with the user device.

20. The method of claim 19, further comprising:
determining a plurality of attributes associated with the first content; and
creating, based on the plurality of attributes and the identifier associated with the user device, a profile.

21. The method of claim 20, further comprising determining, based on the created profile, an advertisement to be presented in the first content.

22. The method of claim 19, further comprising determining an advertisement to be placed in the second content, wherein the advertisement is not based on the identifier associated with the user device.

23. The method of claim 18, wherein the first time interval is different from the second time interval.

* * * * *